Aug. 7, 1945.   E. WILDHABER   2,381,150
DRESSING MECHANISM
Filed Jan. 21, 1943   5 Sheets-Sheet 1

Inventor
ERNEST WILDHABER
By
Attorney

Aug. 7, 1945.  E. WILDHABER  2,381,150
DRESSING MECHANISM
Filed Jan. 21, 1943  5 Sheets-Sheet 2

Inventor
ERNEST WILDHABER
Attorney

Aug. 7, 1945.   E. WILDHABER   2,381,150
DRESSING MECHANISM
Filed Jan. 21, 1943   5 Sheets-Sheet 3

Inventor
ERNEST WILDHABER
Attorney

Aug. 7, 1945.  E. WILDHABER  2,381,150
DRESSING MECHANISM
Filed Jan. 21, 1943  5 Sheets-Sheet 4

Inventor
ERNEST WILDHABER
By
Attorney

Inventor
ERNEST WILDHABER
Attorney

Patented Aug. 7, 1945

2,381,150

UNITED STATES PATENT OFFICE 2,381,150

DRESSING MECHANISM

Ernest Wildhaber, Brighton, N. Y., assignor to Gleason Works, Rochester, N. Y., a corporation of New York Application January 21, 1943, Serial No. 473,067

10 Claims. (Cl. 125—11)

The present invention relates to dressing mechanisms and particularly to mechanisms for dressing the tip surfaces of grinding wheels such as are used in the grinding of gears and in the grinding of gear cutting tools.

In ordinary drives the gears are usually made with quite a large factor of safety and can carry readily any load likely to be encountered in use. Only the sides of the gear teeth therefore are ordinarily ground since it is only the sides of the teeth of any gear that do the driving. Aeroplane gears, however, are heavily loaded to keep their sizes and therefore their weights at a minimum. As a result, it has been found necessary to grind the bottoms as well as the sides of the tooth spaces of such gears so that the bottoms of the spaces may blend with the tooth sides in smooth, uninterrupted curves. If they do not, cracks tend to develop in the fillets when the gears are under load and the gears eventually fail.

In order to produce tooth space bottoms which will blend smoothly with the sides of the teeth, it has heretofore been proposed to dress the tips of the grinding wheels, which are used in grinding the gears, to elliptical shapes. A wheel having its tip dressed to an elliptical shape will grind a flatter bottom in the tooth space of a gear than would be obtained with a wheel whose tip is dressed to a circular arcuate shape, yet the fillet curves at the sides of the tooth space will blend properly into the tooth sides. For some jobs, however, especially for gears of large pitches, the tooth bottoms become too rounded when ground with a wheel having an elliptically shaped tip. Still flatter surfaces in the bottoms of the tooth spaces are required to avoid interference with the tops of the teeth of the mating gear. Moreover, an elliptical shape is not satisfactory for the tip surface of a gear grinding wheel when the sides of the tooth spaces are ground one side at a time, for then a ridge will be left in the bottom of each tooth space where the ellipse formed by the wheel in grinding one side of the tooth space joins the ellipse formed by the wheel in grinding the other side of the tooth space.

Grinding is, of course, a final step in the production of a gear, and gears are usually cut to approximate shape before grinding. Heretofore the cutting has been performed with standard cutters. The blades of such cutters may have rounds at the junctures of their sides with their tips, but the tips themselves are straight. The bottoms of the tooth spaces of a gear cut with such a cutter have a shape differing considerably, therefore, from an elliptical shape or from the other shapes desired on the finished gear. The result is that the grinding wheels have to remove considerable stock from the tooth space bottoms in the grinding operation in order to produce the desired final finished shape. This puts a heavy burden on the tips of the wheels, which is where the wheels are narrowest, and materially reduces the life of the wheels.

One object of the present invention is to provide a dressing mechanism which is capable of dressing a shape on the tip of a grinding wheel that has smoothly rounded portions at its sides.

A further object of the invention is to provide a dressing mechanism capable of dressing accurately in a single operation a substantially flat surface on the tip of a grinding wheel with well rounded portions at the sides of said flat surface.

A still further object of the invention is to provide a dressing mechanism which will be capable of dressing an elliptical surface or a substantially flat surface, or any other desired shape on the tip of a grinding wheel with well-rounded portions at the sides of the tip surface.

Still another object of the invention is to provide a dressing mechanism for dressing a desired shape on the tip surface of a grinding wheel and rounds at the sides of the tip surface by a single swinging movement of a single dressing tool.

A further object of the invention is to provide a dressing mechanism capable of dressing a convex shape on a grinding wheel with well rounded portions at the juncture of the sides and the tip surface of the wheel so that when the wheel is used in the grinding of a gear, it will grind bottoms in the tooth spaces of the gear which will blend properly with the sides of the gear teeth.

Another object of the invention is to provide a dressing mechanism capable of dressing a concave groove in the tip surface of a grinding wheel with well rounded portions at the sides of the groove so that the wheel may be employed to produce gear cutter blades having smooth rounds joining the tips with the sides of the blades.

A still further object of the invention is to provide a dressing mechanism capable of dressing a concave groove in the tip surface of a grinding wheel with well rounded portions at the sides of the groove and of such form that this wheel may be employed in relief-grinding the tip surfaces of face-mill gear cutter blades that are to be used in the cutting of gears whose tooth space bottoms as well as their tooth sides are subsequently to be ground. In this way cutters can be made which will cut tooth space bottoms with properly rounded fillets so that minimum and uniform amounts of stock may be left on the cut gear to be removed in the grinding operation.

Other objects of the invention will be apparent hereinafter from the specification and from the recital of the appended claims.

In the dressing mechanism of the present invention, the dressing tool is mounted on a shaft that is oscillatable and that may be moved axially simultaneously with its oscillation. The shaft is positioned so that its axis of swing is inclined at other than right angles to the tip plane of the wheel, which is a plane containing the tip of the wheel or tangent to the tip. The oscillatory motion of the shaft causes the dressing tool to swing in a circular path about the axis of the shaft, but because of the inclination of the tool axis to the tip plane of the wheel, this path will be an elliptical path in an axial plane of the wheel.

The axial motion of the shaft is controlled by a cam. In the preferred embodiment of the invention, the cam has a control surface which in part is a plane perpendicular to the axis of the shaft and in part a surface of revolution of curved profile shape whose axis is parallel to the axis of the shaft. The cam is mounted for adjustment redially of the axis of the shaft and may be positioned so that its plane surface alone is in operative position, or the surface of revolution alone is in operative position, or so that the plane surface is operative during parts of the swing of the shaft and the surface of revolution during other parts of the swing of the shaft.

If the cam is so positioned that the plane surface alone is operative, then the shaft has no axial motion during its swing, and the dressing tool will dress an effective elliptical surface on the tip of the wheel. If the plane surface and the surface of revolution are each operative then the elliptical path can be modified so that an approximately flat tip surface is dressed on the wheel while elliptical rounds are formed at the junctures of the tip surface with the sides of the wheel. If the axial movement of the shaft is controlled wholly by the toric surface of revolution, the rounds as well as the tip surface can be modified from elliptical shape, the amount of modification depending on the shape of the toric surface of the control cam and upon its position.

For dressing a wheel which is to grind the bottoms of the tooth spaces of a gear, the dressing tool is so positioned that it will dress a convex surface on the tip of the wheel. For dressing a wheel which is to relief-grind the tip surfaces of cutter blades, the dressing tool is so positioned as to grind a concave surface on the tip of the wheel. It will be understood, however, that the dressing mechanism of the present invention may also be used in dressing the sides of a grinding wheel, where it is desired to dress a curved profile shape.

Where the dressing mechanism of the present invention is employed to dress convex tip and rounds on a grinding wheel, it is to be understood that separate dressers of any usual or suitable form may be employed for dressing the sides of the wheel themselves and they form no part of the present invention. Similarly, where the dressing mechanism of the present invention is employed to dress a concave groove in the periphery of a grinding wheel, a separate dresser or dressers may be employed for trimming the rest of the periphery of the wheel.

Several different embodiments of the invention are illustrated in the accompanying drawings in which:

Fig. 16 is a diagrammatic view further illustrating the movement of the dressing diamond when the control cam of Figs. 8 and 9 is so adjusted as to impart an axial motion to the tool carrying shaft simultaneously with the swinging motion of the shaft;

Figures 1, 17, 18, 19, 20:
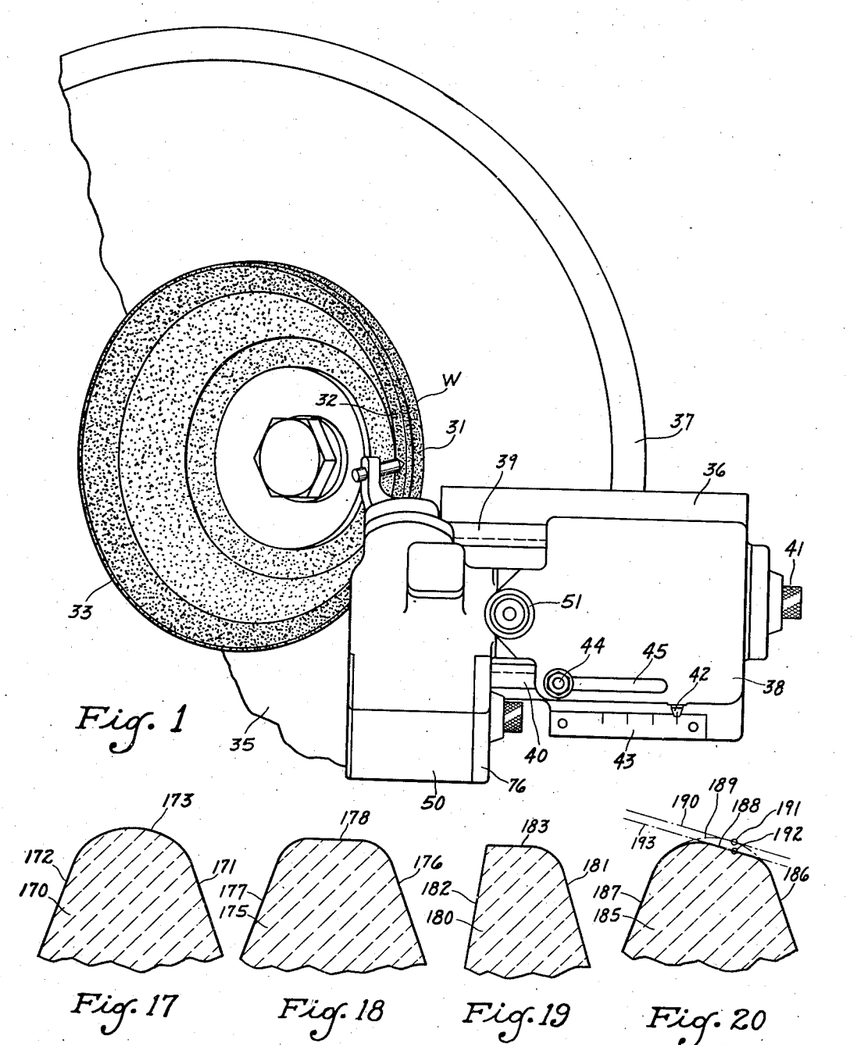
Fig. 1 is a fragmentary elevational view, looking at the wheel end of a spiral bevel gear grinding machine of known construction, and showing an end-dressing mechanism constructed according to one embodiment of the present invention mounted thereon.
Figs. 17, 18, 19 and 20 are fragmentary sectional views of the tip portions of grinding wheels, and illustrating various shapes that may be dressed on the tips of the wheels with the dressing mechanism of the present invention.
Figure 2:
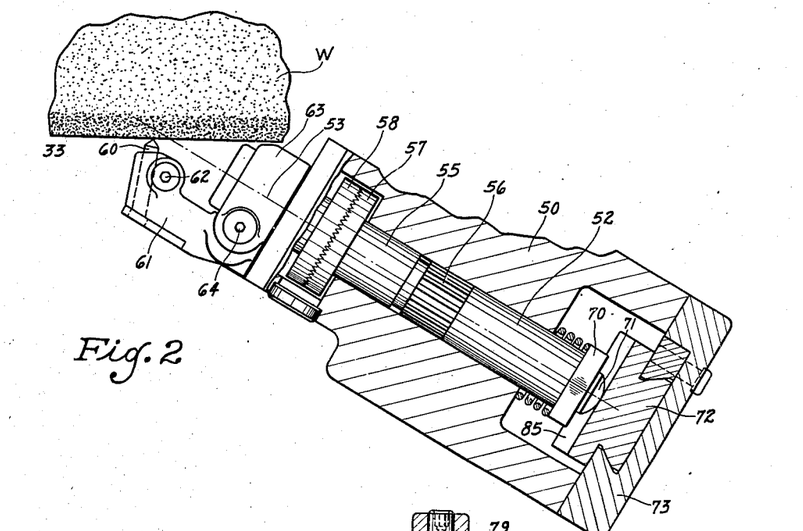
Fig. 2 is a part elevational, part transverse sectional view on an enlarged scale through the end dressing mechanism, and showing the position of the dresser relative to the wheel in dressing a convex surface on the tip of a wheel.

The dressing mechanism of the present invention has been illustrated in Figs. 1 and 2 as applied to a grinding machine of the type disclosed in the Bullock et al. Patent No. 2,099,674 of November 23, 1937. The grinding wheel, which is to be dressed, is denoted at W. It is a cup-shaped, oscillatory grinding wheel and has active side surfaces 31 and 32 and an active tip surface 33. The wheel is mounted on a shaft that is rotatably journaled in the cradle 35 of the grinding machine.

The dressing mechanism of the invention is carried by a bracket 36 which is secured in any suitable manner to the housing 37 for the cradle 35. There is a slide 38 mounted on the bracket 36 for rectilinear adjustment thereon. The slide 38 slides in guides 39 and 40 formed on the bracket 36 and is adjusted by means of a screw shaft (not shown) which is journaled in the slide and which engages in a nut (not shown) that is secured to the bracket 36. The screw shaft may be manipulated by the knurled knob 41. The adjustment of the slide may be made accurately by means of a pointer 42 which is secured to the slide and which reads against graduations on a scale 43 that is secured to the bracket. The slide 38 can be secured in any adjusted position by any suitable means including the bolt 44 which passes through an elongated slot 45 formed in the slide and which threads into the bracket.

Mounted on the slide 38 for rectilinear adjustment thereon in a direction at right angles to the direction of adjustment of the slide itself on the bracket 36 is the housing 50 for the dressing mechanism. The adjustment of the housing on the slide is effected by rotation of a screw shaft (not shown) that is journaled in the slide 38 and that threads into a nut (not shown) which is secured to the housing. A dial gage 51 which is secured to the outer end of the screw shaft serves to permit making this adjustment precisely.

There is a shaft 52 mounted in the housing 50 for both rotatable and axial movement, and the housing 50 is so constructed that the axis 53 of this shaft is inclined at other than right angles to the tip plane of the wheel, as clearly shown in Fig. 2. Mounted on the shaft 52 coaxially thereof is a sleeve member 55. This sleeve member has spur pinion teeth 56 of relatively wide face-width cut on its periphery at one end. At its other end, sleeve member 55 has an enlarged head which is provided with teeth to form one member 57 of a fine-toothed face-clutch. The other member 58 of this clutch is formed on a sleeve member 59 that is keyed to the shaft 52 by means of the key 54.

The dressing tool 60 is clamped by means of a bolt 62 in a split clamp formed at one end of an arm 61. This arm 61 is provided at its other end with a ring-like portion 63 which is in the form of a split clamp and which fits over the periphery of the sleeve member 59. The arm 61 and its ring-like portion 63 are adjustable on the sleeve member 59 about the axis 53 of the shaft 52, and may be clamped to the sleeve member after adjustment by tightening up the bolt 64. The ring-like portion 63 of arm 61 is held against axial movement relative to sleeve member 59 by a washer 65 which is secured to the shaft 52 by a screw 66. The washer and screw also serve to hold the clutch members 57 and 58 in engagement against the tendency of the spring 68 to move them out of engagement.

Figures 3, 5:
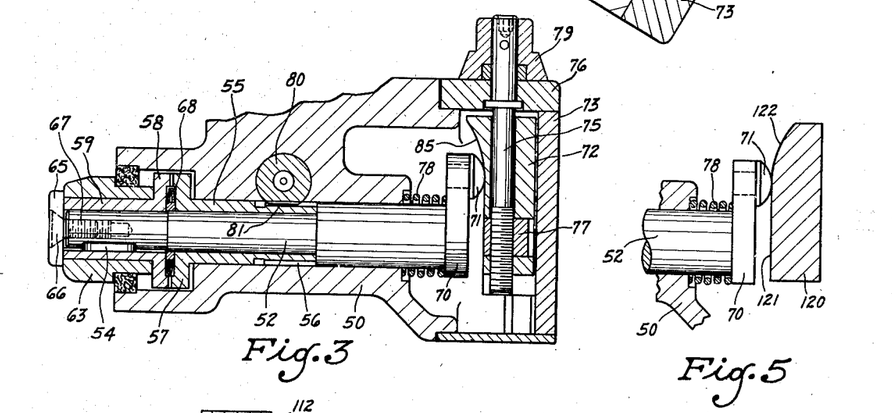
Fig. 3 is a fragmentary sectional view through the dressing mechanism taken at right angles to the section of Fig. 2.
Fig. 5 is a view similar to Fig. 4, but illustrating a still further modification of the invention, employing a control cam having an active surface of convex profile shape.

Integral with the shaft 52 at the rear end thereof is an arm 70. This arm carries a follower 71 which is preferably of spherical shape. The follower 71 is adapted to ride on the face of the control member 72 (Figs. 2 and 3).

This control member 72 is mounted in a closure member 73 for adjustment in a direction at right angles to the axis 53 of the shaft 52. For this purpose the control member is formed with a dove-tailed portion that slides in ways provided on the closure member 73. The closure is secured in any suitable manner to the rear end of the housing 50. The control member is adjusted by rotation of a screw shaft 75 which is journaled in a side plate 76 forming part of the closure and which threads into a nut 77 that is secured in the control member 72. A dial gauge 79, that is pinned to the shaft 75, permits of adjusting the control member precisely. A coil spring 78, which surrounds the shaft 52 and which is interposed between the housing 50 and the arm 70, serves to hold the follower 75 in engagement with the operating front face of the control member.

The shaft 52 is adapted to be rocked by reciprocation of a hydraulically actuated piston 80 which reciprocates in the housing 50 and which is formed at one side with rack teeth 81 that mesh with the pinion teeth 56 of sleeve member 55. When the clutch members 57 and 58 are engaged, the oscillatory motion of sleeve 55 is transmitted through the clutch members and the key 54 to the shaft 52. The piston may be operated in the usual way under control of a manual control valve (not shown).

Figure 8:
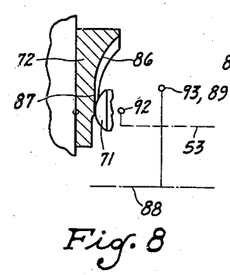
Figs. 8 and 9 are diagrammatic views taken at right angles to one another and further illustrating the construction of the control cam employed in the embodiment of the invention shown in Figs. 1 and 2.
Figure 9:
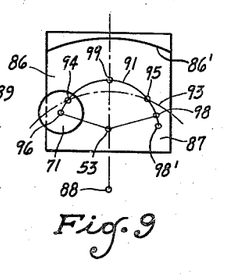

The active surface 85 (Fig. 2) of the cam member 72 is composed, as shown in Figs. 8 and 9, of a concavely profiled surface 86 and an adjoining plane surface 87. The plane surface 87 is perpendicular to the axis 53 of swing of the shaft 52. The surface 86 is of a concave circular arcuate profile shape, the center of a mean profile being at 89. This surface 86 is inclined to the plane surface 87 and is a toric surface of revolution whose axis 88 is parallel to the axis 53 of swing of the shaft 52.

Figure 6:
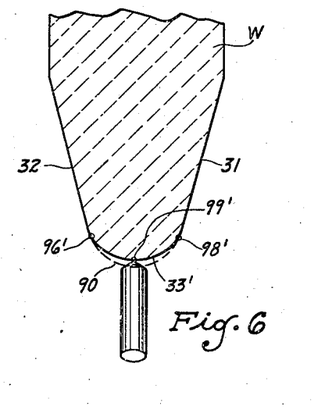
Fig. 6 is a diagrammatic view taken in an axial plane of the grinding wheel and showing the path of movement of the dressing tool in this plane when no axial motion is imparted to the dressing tool.

When the control member 72 is at its zero position of adjustment and the follower 71 rides on the plane surface 87 exclusively as the shaft 52 swings on its axis, there will be no axial motion imparted to the shaft 62, and the dressing tool 60 will simply describe a circular arc about the axis 53. Inasmuch, however, as this axis 53 is inclined to tip and axial planes of the grinding wheel, the dressing tool will, even in this position of control member 72 dress an elliptical tip surface on the wheel in an axial plane of the wheel. This is illustrated in Fig. 6 where 33' denotes the elliptical top surface dressed by the swinging diamond. One end of the ellipse is denoted at 96' and the opposite end at 98', while 99' is a mean point in the arc of swing. The dotted line 90 shows, for comparison, a circular arcuate outline.

In Figs. 8 and 9, the cam member 72 is shown adjusted radially so that the toric surface 86 as well as the plane surface 87 of the control member 72 are in operative position. In Fig. 9, 91 denotes the path of the center 92 of the sphere surface of follower 71 as the follower swings about the axis 53 of the shaft 52. 93 denotes the projected centerline of the curved abutment surface 86 of the cam. In the position shown in Figs. 8 and 9, the projected center line 93 intersects the arc 91 at points 94 and 95. It will be seen, therefore, that the contact of the abutment 71 with the active surface of the cam member 72 will shift from the plane surface 87 to the concave surface of revolution 86 at point 94 and back again to the plane surface at point 95, contact being with the plane surface during the portions 96—94 and 95—98 of the swing of the diamond, and being with the concave surface during the portion 94—95 of the swing. The shaft 52, accordingly, will have no axial motion during swing through the arcs 96—94 and 95—98, but will be moved axially during the swing through the arc 94—95.

The motion of the diamond is further illustrated in Fig. 16. When there is no axial motion the diamond swings in a circular path which appears as a straight line 100 in this figure. The dotted line 100′ denotes the path taken by the diamond due to its axial movement. Assuming that the shaft is swinging in a clockwise direction, the diamond, as already stated, travels in a circular path in a plane from point 96 to point 94 and then advances axially forwardly between points 94 and 99. It returns axially rearwardly again between points 99 and 95 and continues to swing in a plane between points 95 and 98. For counterclockwise swing of the shaft, the axial movements of the shaft will, of course, be in the reverse directions. The dressing tool is shown in full lines at 60 in Fig. 16 in the position which it will occupy at the center of its swing if no axial motion is imparted to shaft 52, and in dotted lines at 60′ in a position such as it will occupy at the center of its swing when axial motion is imparted to shaft 52. T denotes a plane parallel to the tip plane of the wheel and angle $i$ is the angle of inclination of the axis 53 of shaft 52 to this plane.

Figures 7, 10, 11:
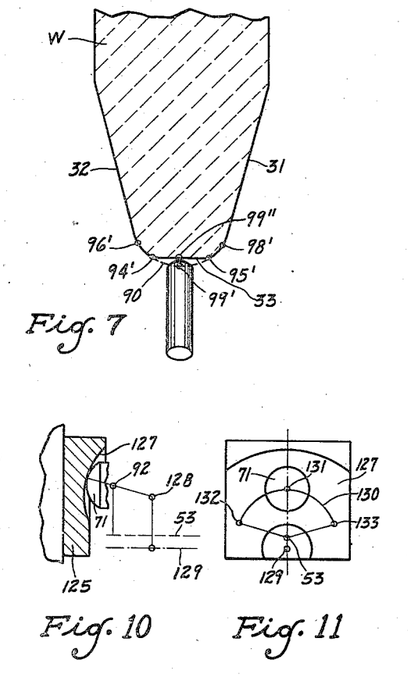
Fig. 7 is a corresponding view, illustrating diagrammatically how the path of the dressing tool may be altered when the axial motion is employed.
Figs. 10 and 11 are diagrammatic views corresponding to Figs. 8 and 9, respectively, and illustrating a different form of control cam and the operation of the dressing mechanism when this type of control cam is used.

The effect of the diamond motion is shown in Fig. 7. This figure is to be compared with Fig. 6 which shows the tip surface produced in a pure elliptical motion. In Fig. 7, the original ellipse is retained between points 96′ and 94′ and between points 95′ and 98′ but between the points 94′ and 95′, the curve is flattened out because of the axial motion. At the center of the arc of swing of the diamond, the diamond point has been advanced from position 99′ to position 99″. Thus a tip surface 33 is dressed on the wheel which is well rounded at its junctures with the sides of the wheel but which is flattened on its top. Through adjustment of the radial position of the control member 72 and suitable formation of the cam surface, the curve dressed on the tip of the wheel can be flattened out to any desired extent.

In the embodiment of the invention illustrated in Figs. 1, 2, 3, 8 and 9, the radius 88—93 of the toric surface 86 is larger than the distance 53—96 of the center 92 of the spherical element 71 from the axis 53 of swing. Figs. 10 and 11 illustrate an embodiment of control member in which these radii are equal. Here a control member 125 is shown which has a wholly toric active surface 127. The toric surface 127 is a surface such as may be produced by swinging a circular arc whose center is at 128 about an axis 129. The radius 128—129 is made equal to the distance 92—53 of the center 92 of contact member 71 from the axis of swing 53. 130 denotes the arc of swing of the sphere center 92 in one position of radial adjustment of the cam member 125. It is obvious that as the contact element 71 moves across the surface 127, axial movement will be imparted to the shaft 52 and that the shaft 52 will be moved further rearwardly under actuation of the spring 78 when the sphere center 92 is at a mean point 131 in its arc of swing than when the sphere center is at the end point 132 or the end point 133 of its arc of swing. When the control member 125 is employed, the rounds at the junctures of the tip surface with the sides of the grinding wheel, which is being dressed, will be of smaller radii than when the control member 72 of Figs. 8 and 9 is employed.

Figure 12:
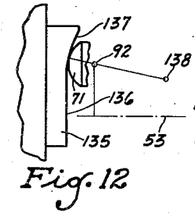
Figs. 12 and 13 are diagrammatic views corresponding to Figs. 8 and 9, respectively, and illustrating a still further form of control cam and the operation of the dressing mechanism when it is used.
Figure 13:
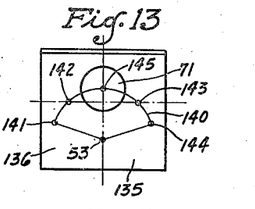

Figs. 12 and 13 illustrate an embodiment of control member in which the radius of lengthwise curvature of the curved portion of the control surface of the cam member is infinitely large. Here the control member 135 has an active surface comprising in part the plane surface 136 and in part the cylindrical surface 137 whose axis 138 is at right angles to the axis of swing 53 of the shaft 52. If this control member is positioned as shown in Fig. 13, then center 92 of the contact element 71 will swing through an arc 140 about the axis 53 of shaft 52. There will be no axial movement of the shaft 52 during swing through the arcs 141—142 and 143—144, because the contact element 71 will then be moving on the plane surface 136. However, during swing through arc 142—145, the shaft 52 will be moved axially forward while during swing through arc 145—143, the shaft 52 will be moved axially rearward for clockwise swing of the shaft 52 while for counterclockwise swing, the reverse movements will take place.

Figure 14:
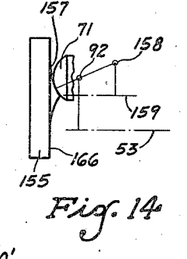
Figs. 14 and 15 are diagrammatic views corresponding to Figs. 8 and 9, respectively, and illustrating a still further form of control cam and the operation of the dressing mechanism when this cam is employed.
Figure 15:
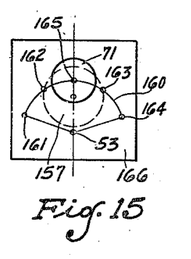

Figs. 14 and 15 illustrate a further embodiment of control member 155 in which the radius of lengthwise curvature of the curved contact surface 157 is smaller than the distance of the sphere center 92 from its axis 53 of swing. Here the control member has an active surface comprising in part the plane surface 166 and in part a surface of revolution 157. The center of profile curvature of the control surface 157 is at 158 and the axis of this surface is at 159. The arc of swing of the center 92 of contact element 71 about axis 53 is denoted at 160. There will be no axial movement of the shaft 52 while the center 92 is moving through arc 161—162 or through arc 163—164 because then the element 71 will be travelling on the plane surface 146. However, while the center 92 is moving through the arc 162—165, the shaft 52 moves forwardly and while the center is moving through arc 165—163, the shaft 52 will move rearwardly again if the shaft is swinging clockwise. For counterclockwise swing of the shaft, the axial movements will, of course, be in the opposite directions.

Various other forms of control members may be employed. Adjustment of the shaft 52 in the sleeve 55 and adjustment of the diamond holder 61 on sleeve 59 permit of further varying the shapes dressed on the grinding wheels. These two adjustments are both about the axis 53, but have different effects.

By disengaging the clutch member 58 from the clutch member 57, the sleeve member 55 can be adjusted angularly on shaft 52. In this way the center of the arc of swing of the dressing tool may be adjusted. Thus, the arc of swing may be changed from 96—98 (Fig. 9) to 94—98'. The result is that the same curve is dressed on the grinding wheel, as previously, but this curve lies between different end points.

An adjustment of the dresser holder 61 on the sleeve 59, however, changes the angular relationship between the dresser holder and the spherical contact member 71. This shifts the axial motion relative to the arc of swing. It permits of dressing a contour on the grinding wheel like that shown in Fig. 20. Here instead of having the mean point of axial displacement of the dresser symmetrically disposed midway between the sides of the wheel, as is the case in Fig. 7, the mean point of axial motion is shifted to one side. 189 is the elliptical path which the diamond would trace on wheel 185 were no axial motion imparted to the dressing tool. 188 is the surface produced on the tip of the wheel when axial motion is combined with the swinging motion. 192 is the position of the diamond point at the point of symmetry of the axial motion. The tangent 193 to the actual top line surface 188 at point 192 is parallel to the tangent 190 to ellipse 189 at point 191, which corresponds to point 192.

Several different forms of grinding wheels that may be dressed by the dressing mechanism of the present invention are illustrated fragmentarily in Figs. 17 to 20 inclusive. Where a cam plate is in zero position of its adjustment so that the follower 71 travels on the plane surface of the cam plate during the whole of swing of the shaft 52, an elliptical top surface will be dressed on the grinding wheel 170 such as denoted at 173 in Fig. 17. This elliptical surface joins the side surfaces 171 and 172 of the wheel smoothly. When the cam member is adjusted radially so as to produce axial motion of the shaft 52 simultaneously with its rotational motion, a top 178 departing very little from a straight line may be produced on the wheel 175 as shown in Fig. 18. The elliptical surface may be retained, however, at the junctures of the top surface 178 with the sides 176 and 177 of the wheel. Of course, a wheel can be dressed with a straight top surface 183 that joins one side only 181 of the wheel with a round, as illustrated in Fig. 19. Such a wheel 180 is employed where only one side of the teeth of a gear is to be ground at a time. The other side 182 of the wheel may then join the tip surface 183 at a sharp angle.

As already indicated, the invention is not confined to the dressing of convex surfaces on wheels, such as may be empolyed in the grinding of gears, but it may be used, also, in the dressing of concave surfaces on grinding wheels such as may be employed in the grinding of cutter blades.

Figure 4:
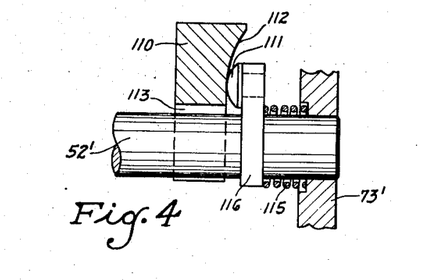
Fig. 4 is a fragmentary view in the same plane as Fig. 3, but illustrating a modification of the invention in which the cam for controlling the axial motion of the dresser is of concave profile shape but is so positioned that the dresser produces a concave instead of a convex surface on the tip of the wheel.

For the dressing of a concave surface on a grinding wheel the control member employed should produce the reverse of the motions used for dressing a convex surface. Fig. 4 shows a control member 110 and a follower 111 such as may be used when it is desired to dress a concave surface on a wheel. The follower is again preferably a spherical contact member exactly like follower 71 and the active surface 112 of the control member 110 may be of exactly the same shape as the active surface 85 of control member 72. Here, however, the control member is mounted in front of the follower instead of behind the follower. The control member 110 is slotted at 113 to straddle the shaft 52' so that it can be adjusted radially of the shaft. This shaft may be of exactly the same construction as the shaft 52, except that it is elongated and is journaled at its rear end in the cover plate 73' of the dresser housing. A coil spring 115, which is interposed between the arm 116 and the cover plate 73', serves to hold the contact member in engagement with the operative surface 112 of the control member 110. The follower 111 is mounted on the arm 116.

The same result as may be obtained with the control member 110, may also be secured by using a control member 120 (Fig. 5) and positioning this control member behind the follower 71. The operating surface of control member 110 comprises a plane portion 121 and a convex profile surface of revolution 122. The plane surface 121 is perpendicular to the axis of swing of shaft 52 while the convexly profiled surface 122 has its axis parallel to the shaft 52.

The curved profiled surfaces of the control members shown in Figs. 1 to 5 inclusive and 8 to 15 inclusive are preferably of circular arc profile shape. The surfaces may be made of other profile curvature, however, as will be obvious.

Figure 21:
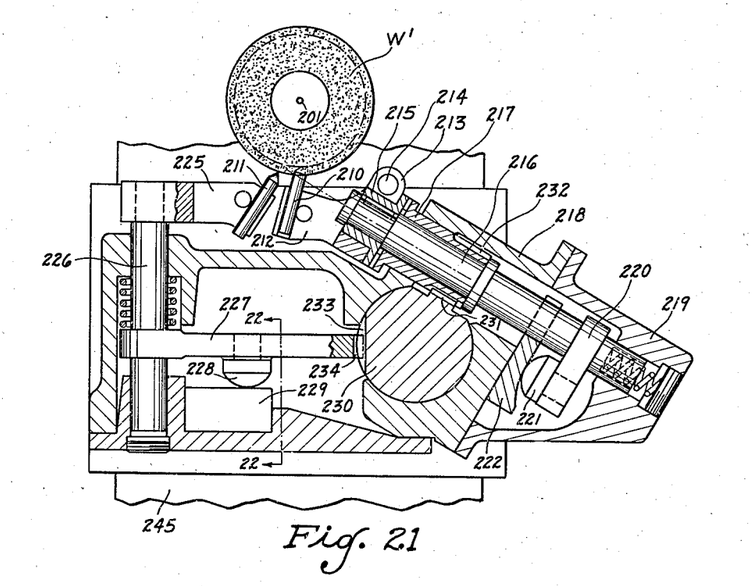
Fig. 21 is a sectional view through a dressing mechanism built according to one embodiment of this invention for dressing a grinding wheel which is to be used in the relief-grinding of the tips of face-mill cutter blades.
Figures 22, 23:
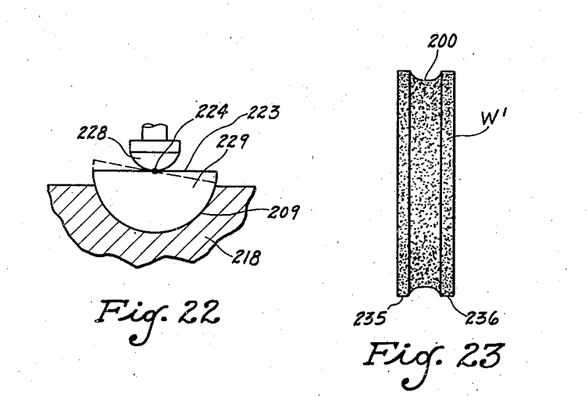
Fig. 22 is a section on the line 22—22 of Fig. 21, showing the construction of the block that may be employed in this dressing mechanism for controlling the axial movement of the dressing tool which is used for trimming the periphery of the grinding wheel.
Figs. 23 and 24 are elevational views showing two different types of wheels which may be dressed with the dressing mechanism of Figs. 21 and 22.

The dressing mechanism for dressing a concave surface on a grinding wheel is illustrated in further detail in Figs. 21 and 22 in connection with one embodiment thereof. Here the wheel to be dressed is denoted at W'. It is of generally cylindrical form but has a concave groove 200 (Fig. 23) formed in its periphery, the bottom of which is substantially straight but the sides of which are rounded at their junctures with the bottom. The axis of the wheel is denoted at 201.

The wheel W' is dressed by two dressing tools 210 and 211. The tool 210 serves to dress the concave groove in the wheel and the tool 211 serves merely to trim the outside periphery of the wheel. The tool 210 is mounted and operated in substantially the same manner as the tool 60 of Figs. 1 to 3 inclusive. It is carried by an arm 212 which is provided with a collar portion 213 in the form of a split clamp that is clamped by the bolt 214 to the sleeve 215. This sleeve is keyed to the shaft 216 and has fine clutch teeth formed on its rear face to engage with clutch teeth formed on the forward face of a sleeve 217 that is mounted on the shaft 216. The sleeve 217 is journaled in the dresser slide 218. The shaft 216 is mounted at its forward end in the sleeve 217 and at its rear end is journaled in a cover member 219 that is fastened in any suitable manner to the slide 218. The shaft 216 carries an arm 220 in which is secured a spherical contact member 221. Mounted in the slide 218 for adjustment thereon radially of the axis of the shaft 216 is a cam member 222. This cam member may be of the same construction as any of the control members previously described, or of any other suitable construction. It may be of the same shape as the control member 110 of Fig. 4, for instance.

The dressing tool 211 is secured in an arm 225 which has a split clamp connection with the shaft 226. The shaft 226 is journaled in the slide 218 and has an arm 227 secured to it. The arm 227 carries a contact member or follower 228 which engages the flat face 223 of a block 229. The block 229 has a cylindrical bearing surface 209 and is mounted in the slide 218 for rotatable adjustment therein. It is shown in full lines in Fig. 22 in zero position of its adjustment and in dotted lines in another position.

The shafts 216 and 226 are oscillated simultaneously, being actuated, for instance, by a piston 230 which is reciprocable in a direction perpendicular to the plane of the drawing of Fig. 21. This piston is provided at one side with rack teeth 231 which mesh with the teeth of a pinion 232 that is integral with the sleeve 217. The piston 230 is provided at another point around its periphery with rack teeth 233 which mesh with the teeth of a spur gear segment 234 that is formed on the free end of the arm 227.

When the piston 230 is moved rectilinearly, then, the diamond dressing tools 210 and 211 are rocked about the axes of the shafts 216 and 226, respectively. As the shaft 216 is rocked, the tool 210 will dress a concave groove in the periphery of the wheel W', the shape of this groove depending upon the position and shape of the control member 222. If the control member 222 is of the same shape as the control member 72 (Figs. 2 and 3) and is adjusted to the same radial position, and the tool holder 212 is adjusted in the same angular position about the axis of the shaft 216, as the tool holder 61 of Fig. 2, and the sleeve 217 is adjusted to the same position about the axis of shaft 216 as the position of sleeve 55 on shaft 52, the concave groove dressed on the wheel W' under control of member 222 will be exactly complementary to the convex surface dressed on the wheel W under control of member 72.

Figure 24:
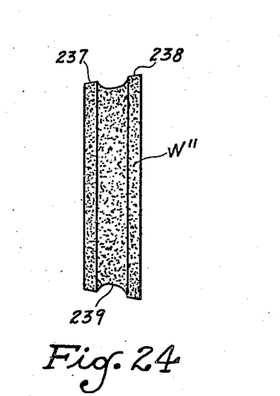

If the block 229 is at the zero position of its adjustment, then no axial movement will be imparted to the shaft 226 during the swing of that shaft and the diamond 211 will simply trim the periphery of the wheel W' to a substantially cylindrical surface, the parts trimmed by this diamond being denoted at 235 and 236 in Fig. 23. If the block 229 is adjusted out of zero position, then as the contact member 228 rides across the surface 223 of the block in the swinging motion of the shaft 226, it will impart an axial movement to the shaft 226 causing the diamond 211 to dress a taper surface on the periphery of the wheel. A wheel may thereby be formed of the type shown in Fig. 24. Here 237 and 238 denote the portions of the periphery of the wheel which are dressed by the diamond 211, while 239 denotes the groove dressed in the periphery of the wheel by the diamond 210.

Figure 25:
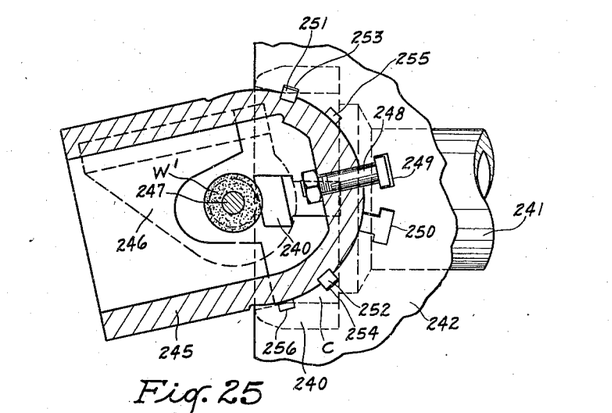
Figs. 25 and 26 are fragmentary views taken at right angles to one another and illustrating more or less diagrammatically the construction and operation of a face mill gear cutter relieving grinder employing a dressing mechanism constructed according to the present invention.
Figure 26:
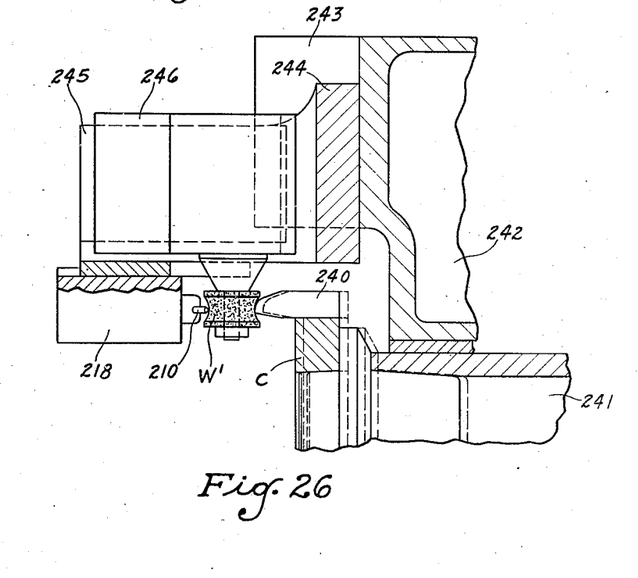

Figs. 25 and 26 illustrate diagrammatically one form of face mill gear cutter relieving grinder on which the dressing mechanism of the present invention may be employed. The gear cutter whose blades are to be relieved is denoted at C. It is secured in any suitable manner to the work spindle 241 of the machine. This spindle is mounted for rotatable and axial movement in a head or column 242. The head is formed with a recess 243 of semi-cylindrical shape which is adapted to receive the complementarily curved end 244 of a bracket 245.

This bracket is of horseshoe shape and is formed with ways on which is mounted the slide 246. The spindle 247, that carries the grinding wheel W', is journaled in this slide. The bracket 245 is also formed with ways on which is mounted the slide 218 that carries the dressing mechanism of Figs. 21 and 22.

The bracket 245 is adjustable angularly in the head 242 to position the grinding wheel in accordance with the top relief angle of the cutter blades 240 to be ground. Face-mill cutter blades are usually ground to a standard relief angle, and the only angular adjustment of the bracket 245 ordinarily required is for hand of cutter. This is all that is shown in Fig. 25. For this purpose, the bracket 245 may be secured to the head 242 in one of two angular positions by means of a T-bolt 248 which is engageable either in the T-slot 249 or in the T-slot 250. Keys 251 and 252 serve to assist the T-bolts in holding the bracket in either of its adjusted positions. The key 251 may be engaged, as shown, in a slot 253 or in a slot 255, while the key 252 may be engaged, as shown, in a slot 254 or in the slot 256.

The adjustment of the slide 246 on the bracket 245 permits of adjusting the grinding wheel into engagement with the tip surfaces of the blades to be ground and of compensating for wear of the grinding wheel. The adjustment of the dresser slide 218 on the bracket 245 permits of maintaining the dressing mechanism in operative relation with the wheel in any position of adjustment of the wheel slide 246.

With the dressing mechanism of the present invention, the groove in the wheel W' can be dressed to any contour desired. Thus it may be dressed to a profile shape exactly complementary to any of the shapes of the grinding wheels shown in Figs. 17 to 20 inclusive, or it may be dressed to any other desired shape. The operation of the machine in the relief grinding of a blade is the same as in standard face mill cutter relieving grinders. The grinding wheel W' is rotated continuously on its axis, being driven in any suitable manner; the cutter spindle 241 rotates continuously on its axis, being driven in any suitable manner; and simultaneously the cutter spindle is given an axial reciprocatory motion, once for each blade to be ground so that as the blade rotates under the grinding wheel, it is advanced axially of the wheel spindle. The cutter is shown in full lines in Fig. 26, in a position of engagement with the wheel, and in dotted lines in withdrawn position ready for start of the grinding of the next blade.

With the dressing mechanism of the present invention, therefore, it is possible to relief grind shapes on gear cutter blades that will permit of cutting tooth bottoms in a gear or clutch which are of the same shape as can be ground with grinding wheels dressed according to the present invention. Thus, the amount of stock that has to be removed in grinding the bottoms of the tooth spaces of a gear or clutch is reduced and can be made substantially uniform over the whole of the surfaces to be ground. This adds materially to the life of the grinding wheel and reduces materially the grinding time. The dressing mechanism of the present invention also affords a practical way of dressing a grinding wheel to grind simultaneously the tops and rounds of conventional cutter blades.

While the invention has been described in connection with embodiments in which the camplate or control member is secured to the housing and the follower is secured to the oscillatory shaft, it will be understood that, if desired, the cam plate can be secured to the shaft and the follower to the housing. In the latter case, it will be the follower that will preferably be made adjustable radially of the axis of the shaft. Furthermore while the invention has been described in connection with the dressing of the tip surfaces of grinding wheels, it will be understood that it may be also employed for dressing curved side surfaces on wheels if desired. It will further be understood that while the invention has been described in connection with certain particular embodiments thereof, it is capable of various further modification, and the present application is intended to cover any variations, uses, or adaptations of the invention, following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. Mechanism for dressing a grinding wheel comprising a support, a shaft journaled in said support for oscillatory and axial movement and having its axis inclined to the tip plane of the wheel and lying in a plane, which is intermediate opposite sides of the wheel, a dressing tool secured to the shaft eccentrically thereof, a cam member and a follower engaging therewith, one of which is secured to the shaft and the other of which is mounted on the support, and one of which is adjustable radially of the axis of the shaft, said cam member having an active surface which is of varying inclination to a plane perpendicular to the axis of the shaft, and means for oscillating said shaft.

2. Mechanism for dressing a grinding wheel comprising a support, a shaft journaled in said support for oscillatory and axial movement and having its axis inclined to the tip plane of the wheel and lying in a plane, which is intermediate opposite sides of the grinding wheel, a dressing tool secured to said shaft eccentrically thereof, a cam member and a follower engaging the cam member, one of which is secured to the shaft and the other of which is mounted on support, and one of which is adjustable radially of the shaft, said cam member having an active surface which is a surface of revolution of curved profile shape whose axis is offset from but parallel to the axis of said shaft, and means for oscillating said shaft.

3. Mechanism for dressing a grinding wheel comprising a support, a shaft journaled in said support for oscillatory and axial movement, a dressing tool secured to said shaft eccentrically thereof, a cam member and a follower engaging the cam member, one of which is secured to the shaft and the other of which is mounted on said support, and one of which is adjustable radially of the axis of the shaft, said cam member having an active surface which in part is a plane surface perpendicular to the axis of the shaft and in part is a surface inclined to said plane, and means for oscillating said shaft.

4. Mechanism for dressing a grinding wheel comprising a housing, a shaft oscillatably mounted in said housing, a dressing tool secured to said shaft eccentrically thereof, means for oscillating said shaft, a cam member and a follower engaging therewith, one of which is secured to the shaft to oscillate therewith and the other of which is mounted in said housing for adjustment radially of the axis of said shaft, said cam member having an active surface which in part is a plane surface perpendicular to the axis of the shaft and in part is a surface of curved profile shape and varying inclination to said plane surface.

5. Mechanism for dressing a grinding wheel comprising a housing, a shaft mounted in said housing for oscillatory and axial movement, a dressing tool secured to said shaft eccentrically thereof, means for oscillating said shaft, a cam member and a follower engaging therewith, one of which is secured to said shaft to oscillate therewith and the other of which is secured to said housing and one of which is mounted to be adjustable radially of the axis of said shaft, said cam member having an active surface which is a toric surface whose axis is parallel to but offset from the axis of said shaft.

6. Mechanism for dressing a grinding wheel comprising a housing, a shaft oscillatably mounted in the housing, a dressing tool secured to the shaft eccentrically thereof, means for oscillating the shaft, a cam member and a follower engaging therewith, one of which is secured to the shaft to oscillate therewith and the other of which is secured to said housing to be adjustable thereon radially of the axis of said shaft, said control member having an active surface which is a surface of revolution of curved profile shape whose axis is offset from and parallel to the axis of said shaft.

7. Mechanism for dressing a grinding wheel comprising a housing, a shaft mounted in said housing for oscillatory and axial movement, a dressing tool secured to said shaft eccentrically thereof, means for oscillating said shaft, a cam member and a follower engaging therewith, one of which is secured to said shaft to move therewith and having its operating portion at a given radial distance from the axis of said shaft, and the other of which is secured to said housing to be adjustable thereon radially of the axis of said shaft, said cam member having an active surface which is a toric surface of revolution whose axis is parallel to the axis of the shaft and whose radius is greater than the aforesaid radial distance.

8. Mechanism for dressing a grinding wheel comprising a housing, a shaft mounted in said housing for oscillatory and axial movement, a dressing tool secured to said shaft eccentrically thereof, means for oscillating said shaft, a cam member and a follower engaging therewith, one of which is secured to said shaft to move therewith and having its operating portion at a given radial distance from the axis of the shaft, the other of which is secured to said housing to be adjustable thereon radially of the axis of said shaft, said cam member having an active surface which is a toric surface of revolution whose axis is parallel to the axis of oscillation of the shaft and whose radius of lengthwise curvature is equal to the aforesaid radial distance.

9. Mechanism for dressing a grinding wheel comprising a housing, a shaft mounted in said housing for oscillatory and axial movement, a dressing tool secured to said shaft eccentrically thereof, means for oscillating said shaft, a cam member and a follower engaging therewith, one of which is secured to said shaft to move therewith and having its operating portion at a given radial distance from the axis of said shaft, and the other of which is secured to said housing to be adjustable thereon radially of the axis of said shaft, said cam member having an active surface which is a toric surface of revolution whose axis is parallel to the axis of the shaft and whose radius of lengthwise curvature is less than the aforesaid radial distance.

10. Mechanism for dressing a grinding wheel comprising a housing, a shaft journaled in said housing, a sleeve mounted on said shaft for rotatable adjustment thereon about the axis of the shaft, a second sleeve secured to said shaft, a tool holder mounted on the second sleeve for adjustment thereon about the axis of the shaft, a dressing tool secured in the tool holder, a cam and a follower engageable with the cam, one of which is secured to the shaft and the other to the housing, said cam being so shaped as to impart axial movement to the shaft on oscillation of the shaft, clutch means disengageably connecting the two sleeves to permit adjustment of the path of swing of the follower on the cam, and means for oscillating the first named sleeve to oscillate the shaft when the clutch means are in engaged position.

ERNEST WILDHABER.